United States Patent
Iwata

[11] Patent Number: 6,069,711
[45] Date of Patent: May 30, 2000

[54] PORTABLE PRINTER/FACSIMILE DEVICE

[75] Inventor: Yasuo Iwata, Tokorozawa, Japan

[73] Assignee: Citizen Watch Co., Ltd., Tokyo, Japan

[21] Appl. No.: 08/978,138

[22] Filed: Nov. 25, 1997

[30] Foreign Application Priority Data

Nov. 26, 1996 [JP] Japan .................................. 8-329040

[51] Int. Cl.⁷ .................................................. H04N 1/00
[52] U.S. Cl. ............................ 358/400; 358/496; 358/498
[58] Field of Search .................................. 358/400, 473, 358/474, 450, 497, 468, 442, 402, 1.1, 401, 296, 496, 498; 379/100.02, 100.01; 380/18; 242/570, 596.4; 347/108, 109, 152, 222

[56] References Cited

U.S. PATENT DOCUMENTS

| | | | |
|---|---|---|---|
| 4,716,291 | 12/1987 | Sakamoto et al. | 250/318 |
| 4,821,974 | 4/1989 | Poehlein | 242/596.4 |
| 4,904,100 | 2/1990 | Enix | 400/613 |
| 5,267,704 | 12/1993 | Kitamura et al. | 242/570 |
| 5,276,527 | 1/1994 | Sugyama et al. | 358/296 |
| 5,420,701 | 5/1995 | Terashima et al. | 358/498 |
| 5,621,540 | 4/1997 | Terajima | 358/404 |
| 5,706,101 | 1/1998 | Yokoyama et al. | 358/400 |
| 5,825,505 | 10/1998 | Toyoda et al. | 358/400 |

FOREIGN PATENT DOCUMENTS 7-203092 8/1995 Japan .

Primary Examiner—Edward L. Coles
Assistant Examiner—Joseph R. Pokrzywa
Attorney, Agent, or Firm—McDermott, Will & Emery

[57] ABSTRACT

A portable printer/facsimile device having a facsimile function and also a normal printer function. A printer body (2) has a scanner unit (5), a printer unit (4), a telephone connection terminal, a printer cable connection terminal and a battery housing for accommodating a battery serving as a drive power source. A facsimile control unit (64) sends facsimile data read by the scanner unit (5) through the telephone connection terminal, and holds received facsimile data inputted through the telephone connection terminal. A printer control unit (51) prints out printing data inputted through the printer cable connection terminal and the received facsimile data held by the facsimile control unit (64) by the printer unit (4). This printer/facsimile device has an easily detachable roll paper holder on an outside surface of the printer body (2).

16 Claims, 11 Drawing Sheets

PORTABLE PRINTER/FACSIMILE DEVICE

BACKGROUND OF THE INVENTION

1. Field of the Invention

The present invention relates to a portable printer/facsimile device having a removable roll paper holder.

2. Description of the Related Art

Recently, as a portable personal computer has become smaller in size and increased its power supply capacity, there arises a demand for the portable personal computer to have a function of printing in a ported location. To meet such demand, a product of a portable personal computer having a printing function has been put on the market. However, such a product with the printing function tends to entail an increase in its size and weight, and the portable personal computer with such extra size and weight has to be carried even when the printing function is not necessary. For this reason, a portable printer unit for connecting with the portable personal computer when printing is necessary has been put on the market. However, such portable printer unit is capable of printing only on a sheet of cut paper, and it has not been capable of using a sheet of roll paper which is convenient to be carried by a user when a facsimile function is incorporated in the printer.

Japanese Laid-open Patent Publication No. Hei 7-203092, for instance, discloses a small-sized facsimile device having a roll paper mounting portion for mounting a roll of paper externally on a facsimile body, and capable of selectively using the cut paper and the roll paper for receiving information. However, the roll paper may be damaged while being carried, and further since the roll paper is simply put on the mounting portion when used, it is feared of falling off the sheet because of inadequate stability of mounting.

In the facsimile device described above, a paper inlet and a paper outlet are provided at the top of the body, a roller for feeding originals and recording paper is arranged in the middle of a substantially U-shaped carrying passage connecting the inlet and the outlet to each other, a line thermal head is disposed in confronting relation to the bottom end of the roller, and a reading unit is disposed on the downstream side of the line thermal head in the substantially U-shaped carrying passage and in confronting relation to the roller. Further, the inlet and the outlet are used to insert and discharge the cut paper and the roll paper for recording, and also used to insert and discharge originals to be sent or copied. Since the facsimile device described above employs the line thermal head as printing means, it is difficult to use the facsimile device as a normal printer to be connected to a personal computer or the like. That is, employing the line thermal head for a printing head complicates a circuit configuration and thus impractical and difficult to constitute a printer.

SUMMARY OF THE INVENTION

A first object of the present invention is to provide a composite portable printer/facsimile device having a facsimile function and also a normal printer function.

A second object of the present invention is to make easier loading and unloading of printing paper by disposing a printing paper insertion position and a printed paper discharge position at a higher level.

A third object of the present invention is to enable the selective use of roll paper and cut paper so that portability of the device can be enhanced by removing a roll paper holder when not needed, and the roll paper holder can be installed, where a large volume of paper is required for printing out received facsimile data. This object further includes to provide a roll paper holder capable of easily switching between the cut paper and roll paper with the roll paper holder mounted on a printer body.

A fourth object of the present invention is to enhance the utility of the device by enabling to be used capable of printing out not only received facsimile data but also printing out data inputted through an external device.

The printer/facsimile device according to the present invention comprises: a scanner unit having a platen roller for feeding originals, arranged in the middle of an original carrying passage between an inlet and an outlet for the original, and a scanner disposed in confronting relation to said platen roller, for reading the information to be sent on the original; a printer unit having a printing platen arranged in the middle of a printing paper carrying passage between a printing paper inlet and a printed paper outlet, and a printing head disposed in confronting relation to the printing platen; a telephone connection terminal; a printer cable connection terminal; a battery housing for accommodating a battery as a drive power source; a facsimile control unit for sending facsimile data read by said scanner unit through said telephone connection terminal and for holding received facsimile data inputted through said telephone connection terminal; and a facsimile control unit for controlling said printer unit to print out the printing data inputted through said printer cable connection terminal and the received facsimile data held by said facsimile control unit.

The scanner unit is disposed below the printer unit. Since the printer unit is arranged at a higher position than the scanner unit, a printing paper insertion position and a printed paper discharge position may be set at a higher level for easier loading and unloading of printing paper.

A roll paper holder is detachably mounted on the outside of the printer body. When a large volume of paper is required for printing out received facsimile data, the roll paper can be used by mounting the roll paper holder loaded with the roll paper on the printer body. When the roll paper is not needed, the roll paper holder can be removed from the body for enhancing the portability of the device.

Since a serial thermal head is employed as the printing head in the printer unit, the circuit configuration is not complicated, thereby making available the function of a normal printer capable of printing out data for printing inputted through an external device.

The roll paper holder comprises: a holder body having a roll paper chamber for accommodating roll paper therein; a roll paper cover pivotally supported on the holder body so as to open and close the roll paper chamber; a roll paper supporting member rotatably supported on the holder body so as to support one end of a core of the roll paper; a roll paper supporting portion provided on the holder body, for rotatably supporting the other end of the core of the roll paper; and an engaging portion and a fixing portion for engaging with the printer body.

The roll paper holder may be fixed to the printer body by means of elastic force of the holder body. A roll paper passage opening is formed by an end surface of the holder body and an distal end of the roll paper cover. Further, the roll paper cover forms a guide for the cut paper to insert into the printer body when the roll paper holder is attached on the printer body. The engaging portion may project from a mounting surface of the holder body, and a claw may be provided at a distal end of the engaging portion. Further, the fixing portion may project from the mounting surface of the holder body, and a recess may be provided in the projecting portion.

The roll paper support member may have a biting portion formed at an end of the roll paper support member so as to bite the core of roll paper, and an operating portion capable of winding up and letting out the roll paper from outside. The operating portion has a disk-like shape and is provided with a projecting knob to transverse the disk through a center of the operating portion. The roll paper supporting member may be provided with a stopper projection having an inclined surface inclined with respect to a direction of inserting the roll paper supporting member into the holder body and a perpendicular surface perpendicular to a direction of pulling out said roll paper supporting member from the holder body, and the stopper projection is elastically sinkable into the roll paper supporting member.

The roll paper supporting portion may be supported by a roll paper supporting arm for giving an urging force to prevent the roll paper from being moved in the axial direction. A transparent window may be provided in a side wall of the holder body in the vicinity of the roll paper supporting portion.

The roll paper supporting member is supported by the holder body slidably in the axial direction so as to removably hold the roll paper, and has an urging member for urging the roll paper supporting member in the axial direction when loading and unloading the roll paper.

DETAILED DESCRIPTION OF THE PREFERRED EMBODIMENTS

Figure 1:
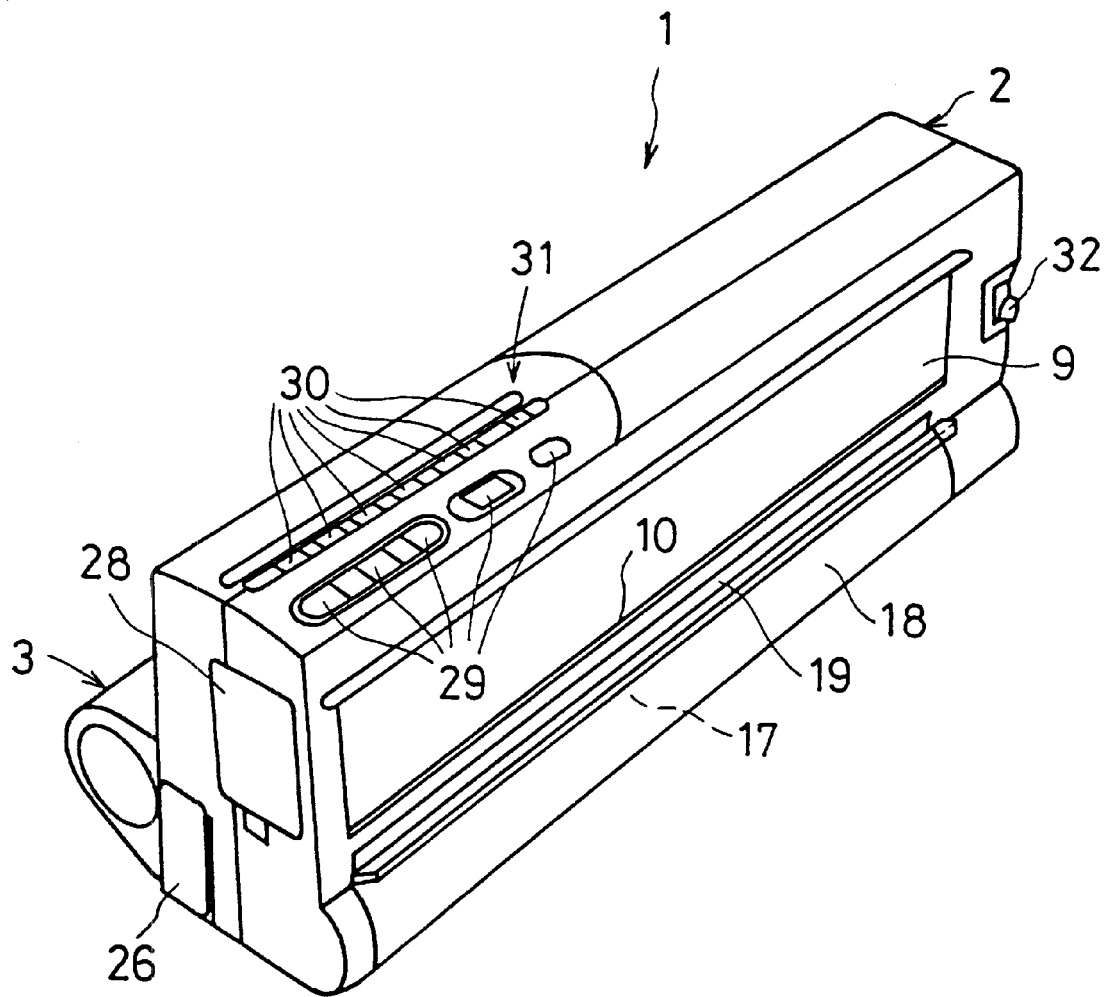
FIG. 1 is a perspective view showing a printer/facsimile device according to one embodiment of the present invention as viewed from the front.
Figure 2:
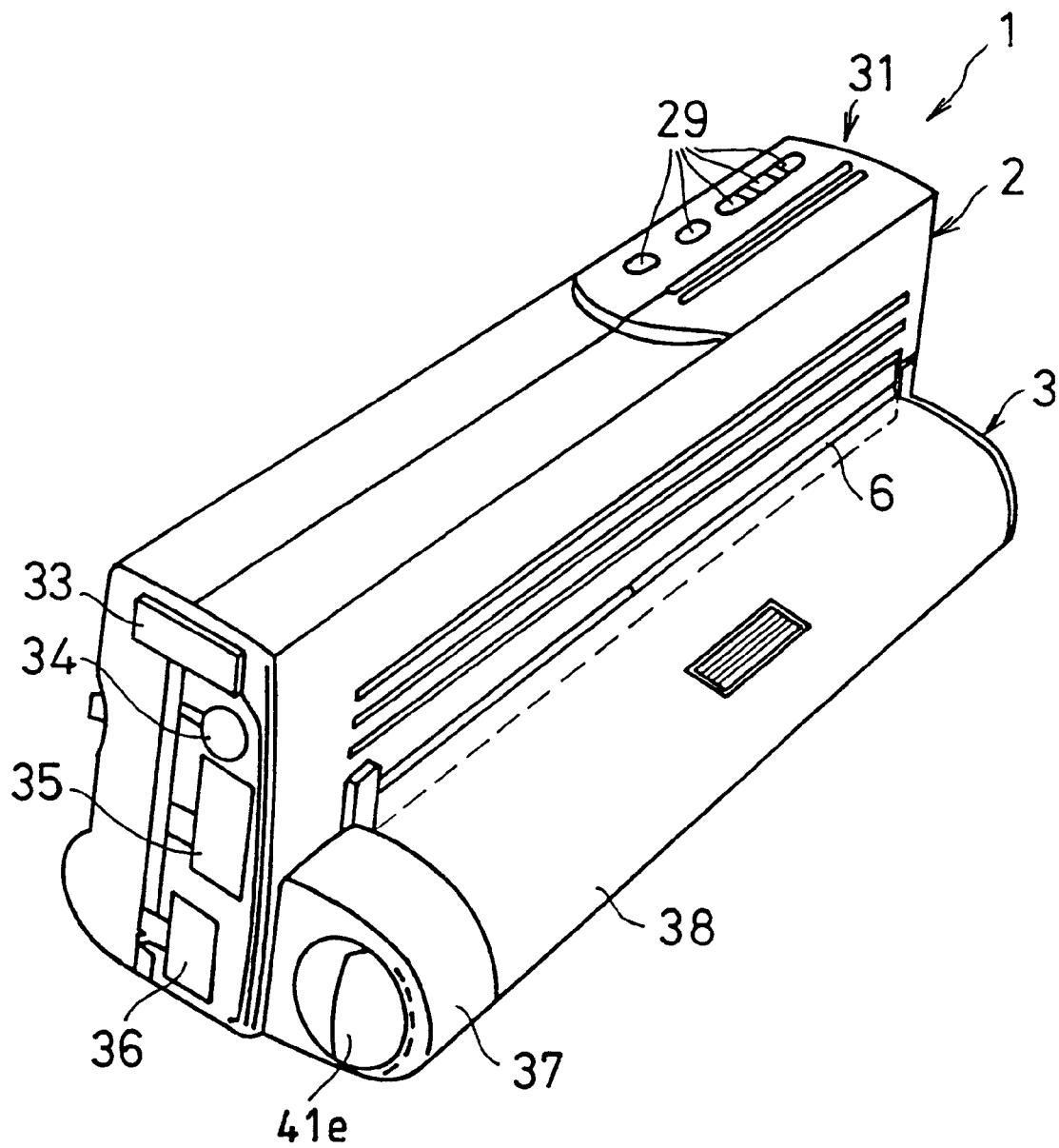
FIG. 2 is a perspective view showing the printer/facsimile device shown in FIG. 1 as viewed from the rear.
Figure 3:
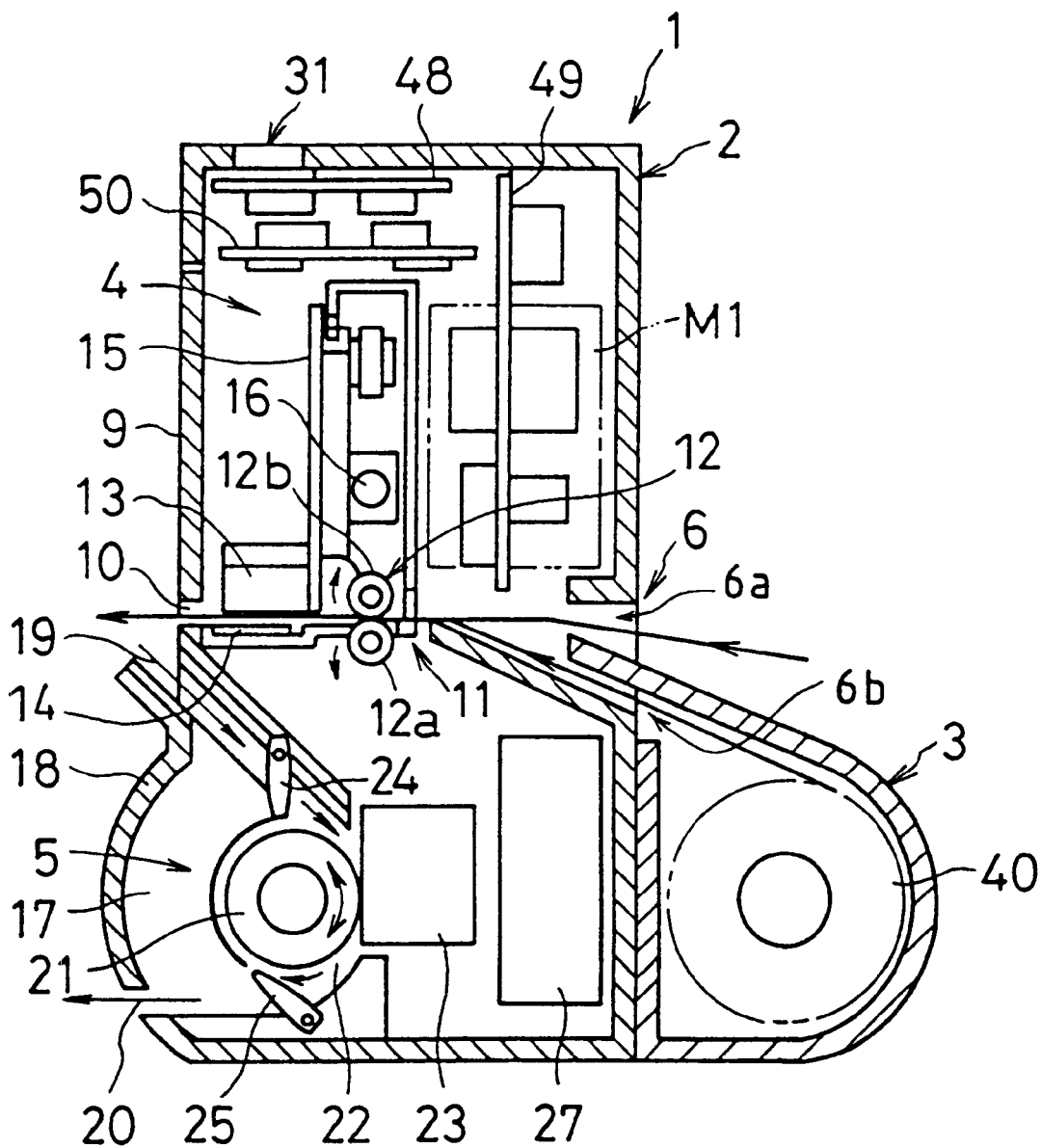
FIG. 3 is a sectional view showing an essential part of the printer/facsimile device shown in FIG. 1.

As shown in FIGS. 1 and 2, a printer/facsimile device 1 comprises a body 2 of a rectangular parallelepiped shape and a roll paper holder 3 removably provided on a lower portion of a rear surface of the body 2. A lateral width of the body 2 is set to be greater than that of a sheet of A4 size. As shown in FIG. 3, a printer unit 4 is arranged at an upper portion of the body 2, and a scanner unit 5 is arranged below the printer unit 4.

A description will now be given on the printer unit 4.

As shown in FIG. 2, a laterally elongate opening 6 is provided in the substantially vertical center of the rear surface of the body 2. As shown in FIG. 3, in a state when the roll paper holder 3 is mounted on the body 2, the upper edge of the roll paper holder 3 is inserted into the opening 6 to partition the opening 6 into upper and lower parts, to form a cut paper inlet 6a on the upper part side of the opening 6 and a roll paper inlet 6b on the lower part side of the opening 6. A feeding passage inside the cut paper inlet 6a and a feeding passage inside the roll paper inlet 6b communicate with each other to coincide inside the opening 6. In a state when the roll paper holder 3 is removed from the body 2, the opening 6 functions solely as a cut paper inlet.

As shown in FIGS. 1 and 3, a front cover 9 is swingably provided on the front surface of the body 2 at a location from the substantially vertical center to the upper portion thereof in a manner such that the upper opposite ends of the front cover 9 are pivotally supported by the body 2. A laterally elongate outlet 10 for printed paper is provided between the lower edge of the front cover 9 and the substantially vertical center portion of the body 2.

As shown in FIG. 3, a horizontal transport passage 11 for printing paper is formed in an inner central portion of the body 2 so as to connect the cut paper inlet 6a (the roll paper inlet 6b) and the printed paper outlet 10 with each other. A pair of upper and lower paper feed rollers 12a, 12b, opposed to each other, are arranged in the middle of the printing paper transport passage 11, a printing head 13 is arranged closer to the front surface of the body 2 than the positions of the feed rollers 12a, 12b and facing the printing paper transport passage 11 from above, and a printing platen 14 is arranged opposite to the printing head 13.

The printing head 13 includes a serial thermal head (for instance, longitudinal 64 pins), and is mounted on a carriage 15 slidably fitted to a carriage shaft 16.

Thus, the printer unit 4 is composed of the cut paper inlet 6a, the roll paper inlet 6b, the printed paper outlet 10, the printing paper transport passage 11, the pair of feed rollers 12a, 12b, the printing head 13, the printing platen 14, the carriage 15 and the carriage shaft 16.

The feed rollers 12a, 12b, the printing platen 14 and the carriage shaft 16 are arranged in the lateral direction of the body 2. The feed rollers 12 are driven by a feed motor (not shown) to feed the cut paper or roll paper toward the paper outlet 10. Further, the carriage 15 is driven by a carriage drive motor M1 so that the carriage 15 mounted with the printing head 13 reciprocates along the carriage shaft 16 in the lateral direction of the body 2 to operate the printing head 13 for carrying out printing on the printing paper.

A description will now be given of the scanner unit 5.

As shown in FIG. 3, a laterally elongate opening 17 is provided below the printed paper outlet 10 in the front surface of the body 2, and a scanner cover 18 is provided swingably to open and covering the opening 17. The lower ends of the opposite edges of the scanner cover 18 are pivotally supported by the body 2, and the upper edge of the scanner cover is bent to curve toward the front surface.

An original inlet 19 for originals to be sent is formed between the upper edge of the scanner cover 18 and the upper edge of the opening 17, and an original outlet 20 is formed between the lower edge of the scanner cover 18 and the lower edge of the opening 17. A scanner platen roller 21 to feed the originals is pivotally supported inside the opening 17 along the lateral direction of the body 2 to rotate freely. There is an original transport passage 22 extending from the original inlet 19 to the original outlet 20 passing the peripheral surface of the scanner platen roller 21 for feeding the originals. A scanner 23 to read data contained in the original is arranged opposite to the rear peripheral surface of the scanner platen roller 21.

The original transport passage 22 between the original inlet 19 and the scanner platen roller 21 has an original insertion sensor lever 24 to detect whether or not the original is inserted, and the original transport passage 22 between the scanner platen roller 21 and the original outlet 20 has an original discharge sensor lever 25 to detect whether or not the original is discharged.

Thus, the scanner unit 5 is composed of the original inlet 19, the original outlet 20, the scanner platen roller 21 for feeding the original, the original transport passage 22 and the scanner 23.

As shown in FIG. 1, a battery cover 26 is swingably provided on a lower portion of one side surface of the body 2, and a battery 27 is housed in the body 2, on the inside of the battery cover 26 as shown in FIG. 3. A carriage rail cover 28 is swingably provided on the upper portion of one side surface of the body 2. The carriage rail cover 28 is opened when the printer is used, and enables the movement of the carriage 15 up to the terminal end of a printing range. An operation panel 31 having a group of operation input keys 29 for input operation and various pilot lamps 30 for indicating operation mode of the device or the like are provided on the left side of the top surface of the body 2. A release lever 32 releases the feed rollers 12a, 12b shown in FIG. 3 from feeding of paper. The lower feed roller 12a is moved downward by pushing up the release lever 32, and the contact of the lower feed roller with the upper feed roller 12b under pressure is released.

As shown in FIG. 2, a digital terminal cover 33 is swingably provided on the upper portion of the other side surface of the body 2, and a digital portable telephone connector (not shown) to connect a digital portable telephone to the body is provided on the inside of the digital terminal cover. An adapter terminal cover 34, a printer cable cover 35 and an analog terminal cover 36 are swingably provided in this order on the side surface of the body 2 in the vertical direction. An adapter terminal (not shown) to connect an AC adapter for DC 8V output to the body is disposed on the inside of the adapter terminal cover 34; a printer cable connecter (not shown) to connect a printer cable to the body is disposed on the inside of the printer cable cover 35, and an analog input terminal (not shown) to connect a general public line to the body and an analog output terminal (not shown) to connect a telephone set to the body are disposed on the inside of the analog terminal cover 36.

Figure 4:
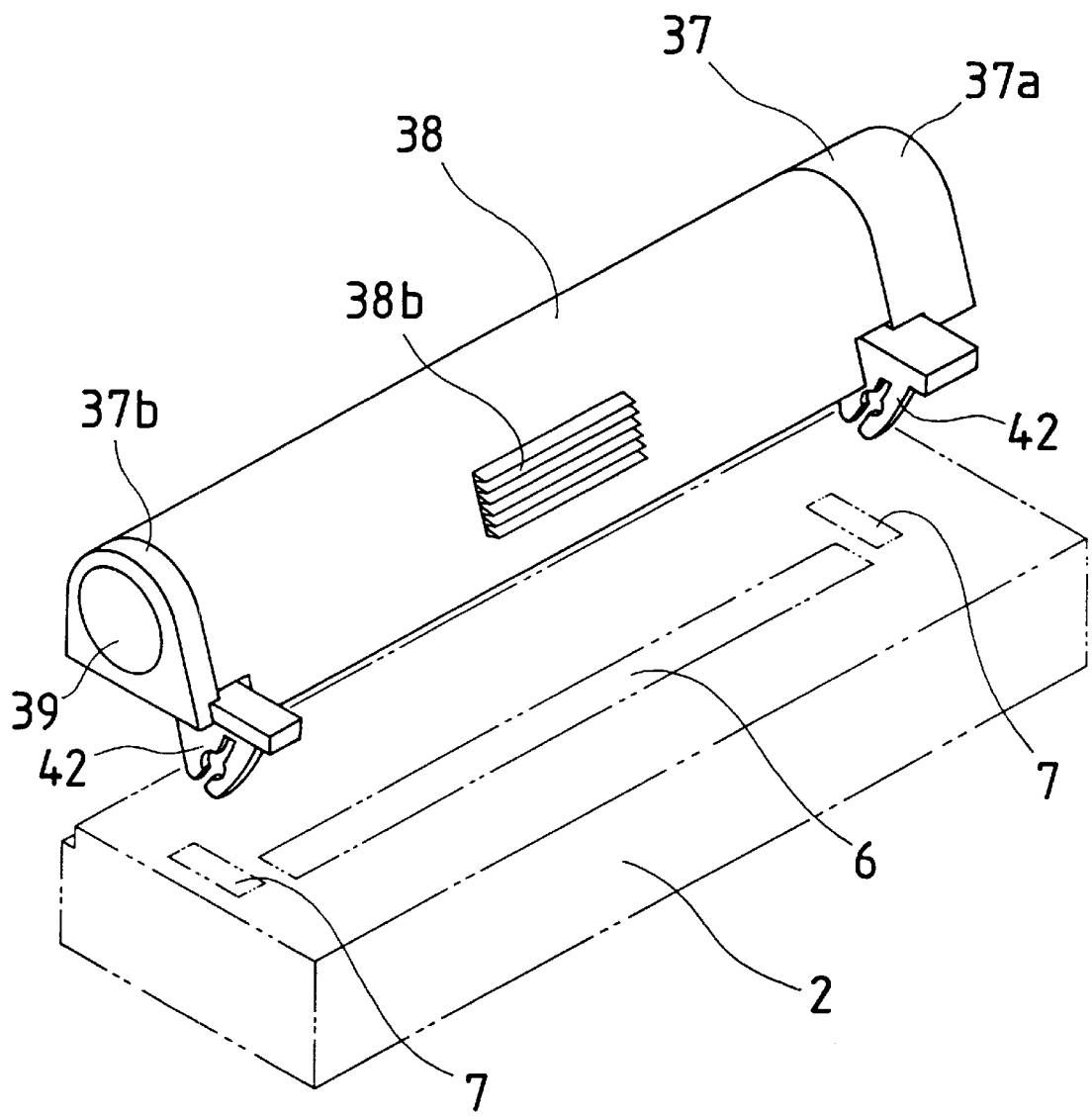
FIG. 4 is a perspective view showing the external appearance of a roll paper holder.
Figure 5:
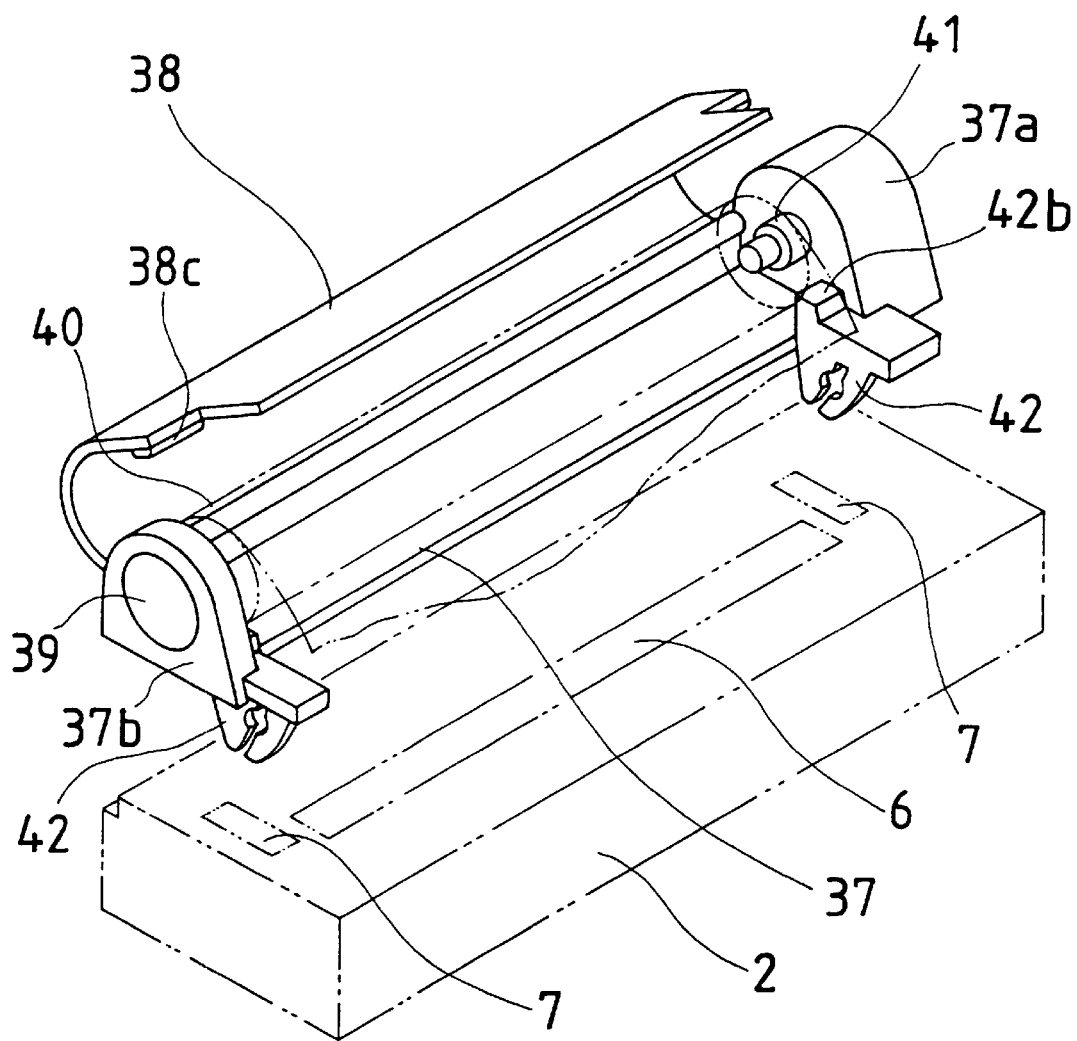
FIG. 5 is a perspective view showing the state of the roll paper holder when a roll paper cover is opened.
Figure 6:
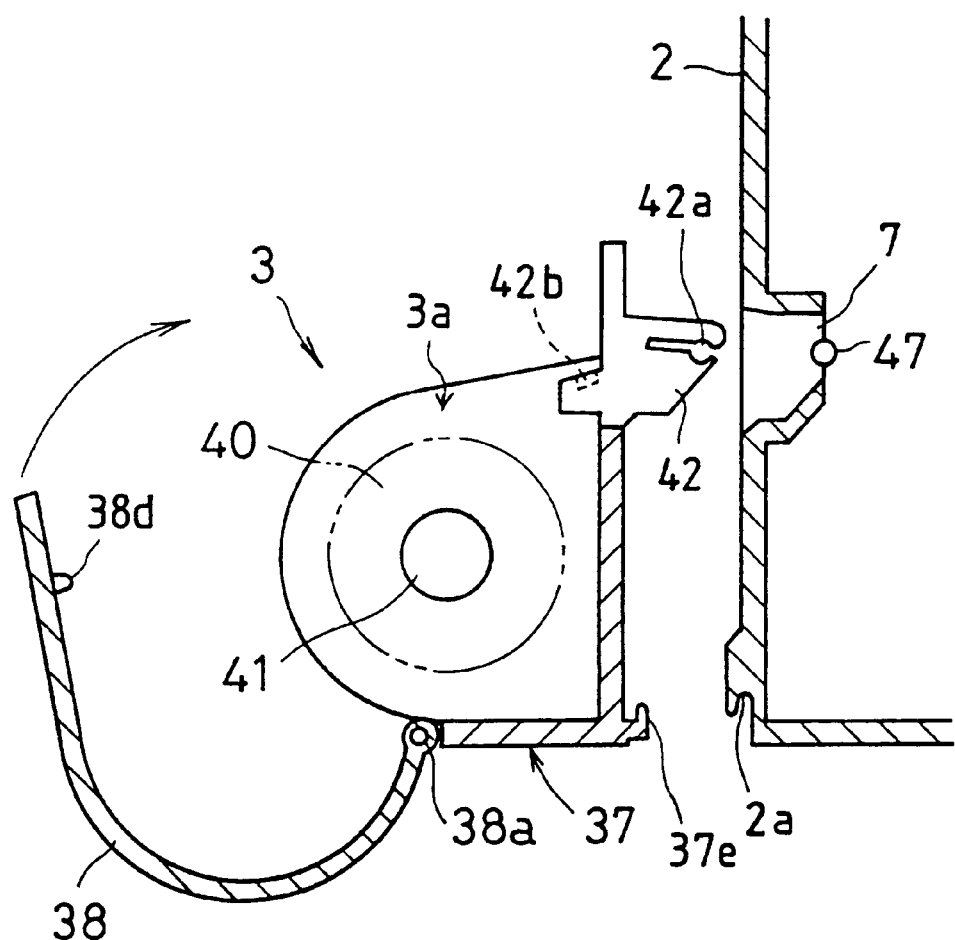
FIG. 6 is a sectional view of an essential part for explaining how to removably mount the roll paper holder on a printer body.

A description will now be given in detail of the structure of the roll paper holder 3 and how to removably mount the roll paper holder 3 on the body 2. As shown in FIGS. 4 to 6, the roll paper holder 3 has a holder body 37 and a roll paper cover 38 swingably supported by the holder body 37. A roll paper housing chamber 3a to house the roll paper therein is defined by the holder body 37 and the roll paper cover 38. The holder body 37 has a right Side wall 37a and a left side wall 37b, and fixing portions 42 are respectively provided below the right side wall 37a and the left side wall 37b. An opening/closing lock 38b having corrugated surface for ease of opening and closing the roll paper cover 38 with the fingers is provided at the center of the front of the roll paper cover 38.

As shown in FIG. 6, the roll paper cover 38 is bent curving downward in a semicylindrical shape so that the front surface side of the roll paper cover gets to fit the peripheral surface of roll paper 40. The roll paper cover 38 is swingably installed through its support portions 38a provided at the lower ends of the opposite edges of the roll paper cover which is pivotally supported by the holder body 37. FIG. 5 shows the opened state of the roll paper cover 38 after having been pivoted about the support portions 38a from the state shown in FIG. 4. A cover fixing hole 42b is formed in each fixing portion 42 on the side of the roll paper housing chamber 3a, and a projection 38c formed in the vicinity of the top at each lateral end of the roll paper cover 38. The roll paper holder is designed so that the projection 38c is engaged with the cover fixing portion 42b, when the roll paper cover 38 is closed.

As shown in FIGS. 4 to 6, the fixing portions 42 are respectively provided below the right side wall 37a and the left side wall 37b of the holder body 37. Each fixing portion 42 has a fixing hole 42a at the top. A projection 47 to engage with the fixing hole 42a provided in each fixing portion 42 is projected from the inside of a fixing groove 7 of the body 2. Further, projections 37e are respectively provided close to the opposite sides of the lower edge of the rear surface of the holder body 37, and engaging grooves 2a to be hooked to claws 37g formed on the roll paper holder 3 are provided close to the opposite sides of the lower edge of the rear surface of the body 2 respectively.

Figure 7:
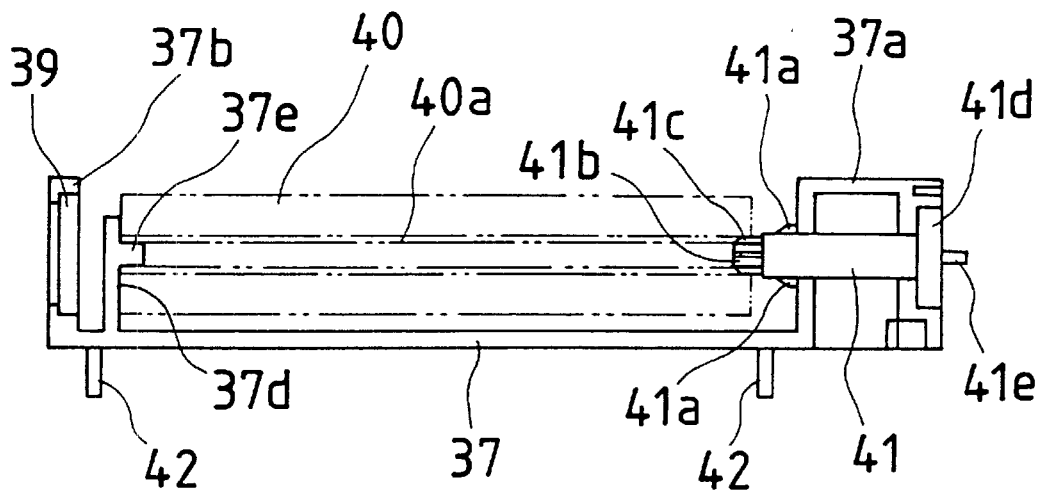
FIG. 7 is a sectional view taken along the center of the roll paper holder.
Figure 8A:
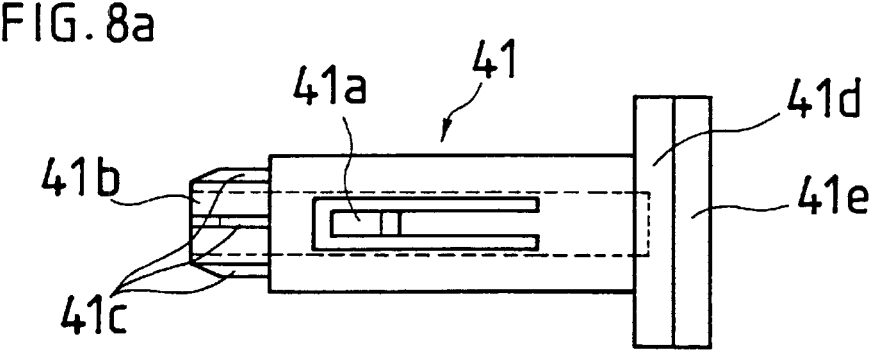
FIG. 8a is an enlarged-scale plan view showing a roll paper operating member.
Figure 8B:
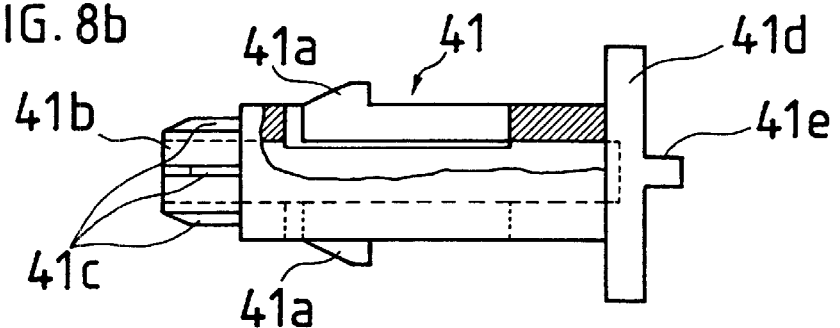
FIG. 8b is a front view showing the same.

Referring to FIGS. 7, 8a and 8b showing cutaway views along the center of the roll paper housing chamber 3a in FIG. 6, description will be made as to the roll paper holder 3. A transparent window 39 of a disc shape to check the remainder of the roll paper 40 is fixedly attached to the left side wall 37b of the holder body 37. A roll paper support arm 37d internally extending from the holder body 37 is provided in the vicinity of the inside of the left side wall 37b, and a roll paper support portion 37e is formed on the inside of the upper portion of the roll paper support arm 37d. The roll paper support arm 37d is made flexible in the axial direction of the roll paper 40, and may be elastically transformed when mounting the roll paper 40. A roll paper operating member 41 is rotatably mounted on the right side wall 37a of the holder body 37. The roll paper operating member 41 comprises two pieces of projected stoppers 41a, a roll paper fitting portion 41b with an end having a slightly smaller diameter for fitting the inside of a core 40a of the roll paper 40, four pieces of bite portions 41c projecting at equal intervals from the periphery of the roll paper fitting portion 41b so as to bite the core 40a, an operating portion 41d formed in a disk shape at the outer end of the roll paper operating member, and a knob 41e projected from the center of the operating portion 41d crossing the operating portion in a diametrical direction. When the roll paper operating member 41 is inserted into the holder body 37, the projecting stoppers 41a are elastically depressed allowing the insertion of the roll paper operating member 41, since the slope of each projecting stopper is forced down by the inner peripheral edge of an insertion hole provided in the right side wall 37a. Since the projection provided at the top is fixed by the right side wall 37a, it is not possible to draw out the roll paper operating member 41 unless the top is depressed inwards, even if the user tries to draw out the roll paper operating member 41.

Since the projecting stoppers 41a are engaged with the right side wall 37a, it will not slip off. When to remove the roll paper operating member, it is necessary to make the projecting stoppers 41a sink toward its axis.

To load the roll paper 40 into the roll paper housing chamber 3a, the roll paper support portion 37e is first pushed outward to the left against the force of the roll paper support arm 37d, the left end of the core 40a of the roll paper 40 is then fitted to the roll paper support portion 37e, and the right end of the core 40a of the roll paper 40 is then fitted to the fitting portion 41b of the roll paper operating member 41. Since the bite portions 41c of the roll paper operating member 41 bite the core 40a, the roll paper 40 can be rotated by rotating the roll paper operating member 41. As shown in FIG. 5, since the roll paper 40 loaded in the roll paper housing chamber 3a is wound around the core counterclockwise as viewed from the direction of the right side wall 37a, a free end of the roll paper 40 can be inserted into the roll paper inlet 6b in the printer body by turning counterclockwise the knob 41e with the fingers in a condition that the roll paper holder 3 is mounted on the printer body 2, while the free end of the roll paper can be withdrawn from the roll paper inlet 6b by turning the knob 41e clockwise in the above condition.

Figure 9:
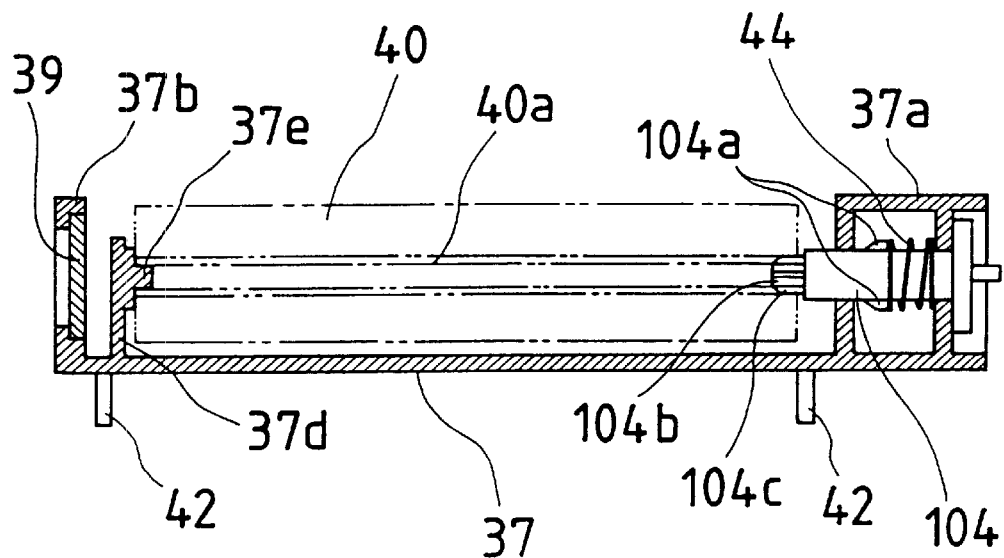
FIG. 9 is a sectional view taken along the center of a roll paper holder according to another embodiment.
Figure 10A:
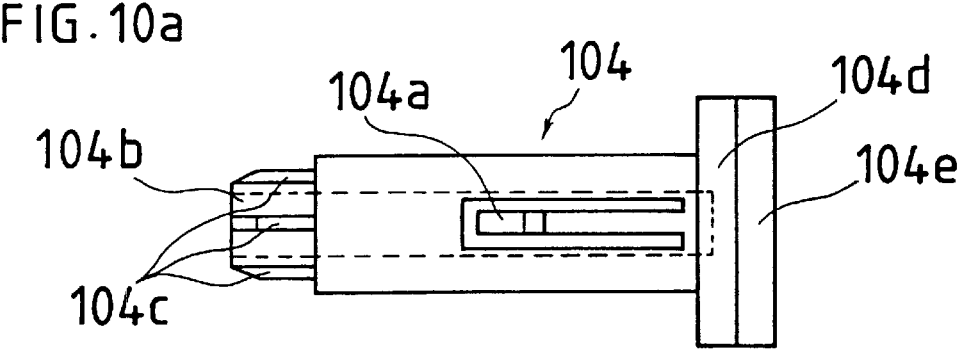
FIG. 10a is an enlarged-scale plan view showing a roll paper operating member shown in FIG. 9.
Figure 10B:
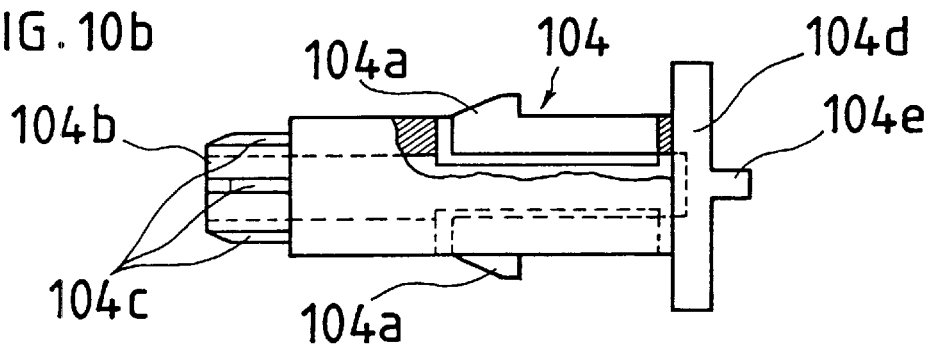
FIG. 10b is a front view showing the same.

A description will now be given of another embodiment of the roll paper holder with reference to FIGS. 9, 10a and 10b. A forcing member 44 being a coiled compression spring for forcing down the roll paper 40 is provided between projecting stoppers 104a and the right side wall 37a.

To load the roll paper 40 in the roll paper housing chamber 3a, a roll paper operating member 104 is first pushed out to the right against the force of the forcing member 44, the right end of the core 40a of the roll paper 40 is then fitted to a roll paper fit portion 104b of the roll paper operating member 104, and the left end of the core 40a is then fitted to the roll paper support portion 37e. The roll paper operating member 104 comprises two pieces of projecting stoppers 104a, the roll paper fitting portion 104b having an end with a slightly smaller diameter for fitting the core 40a, four pieces of bite portions 104c projecting at equal intervals from the periphery of the roll paper fit portion 104b so as to bite the core 40a, an operating portion 104d formed in a disk shape at the outer end of the roll paper operating member, and a knob 104e projecting from the center of the operating portion 104d crossing the operating portion 104d in diametrical direction. Since the projecting stoppers 104a engage with the right side wall 37a, the roll paper operating member will not slip off. To draw out the roll paper operating member, it is necessary to make the projecting stoppers 104a sink towards its axis.

Figure 11:
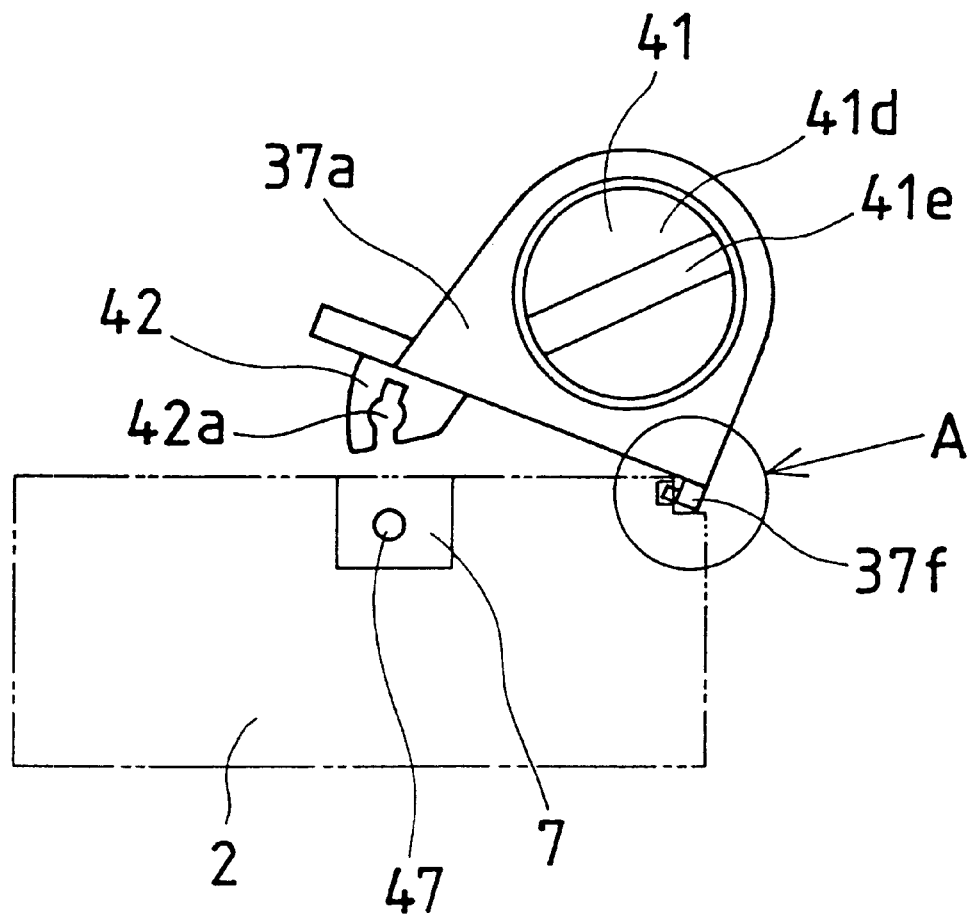
FIG. 11 is a side view showing the state of a roll paper holder before mounted on a printer body.
Figure 12:
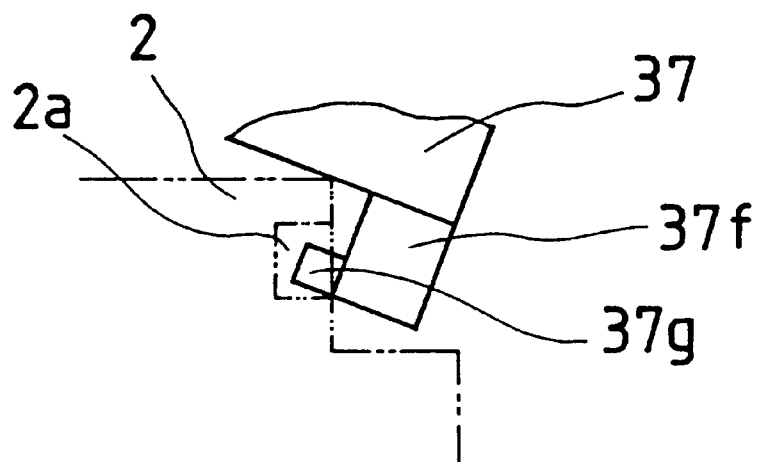
FIG. 12 is a view showing the details of a portion indicated by A shown in FIG. 11.
Figure 13:
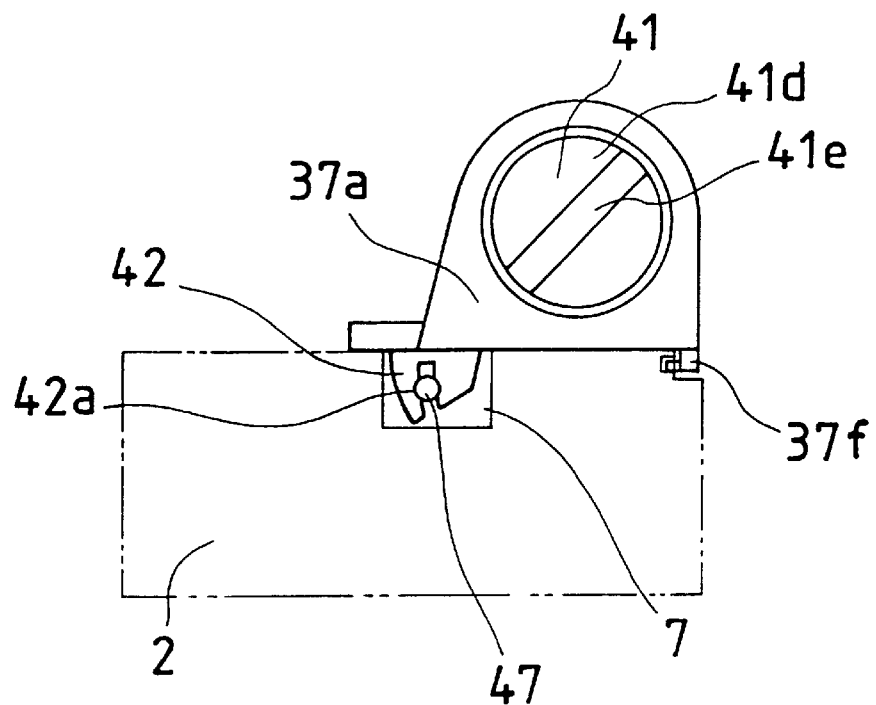
FIG. 13 is a side view showing the state of the roll paper holder mounted on the printer body.

Referring to FIGS. 11 to 13, a description will now be given of a structure and a method of removably mounting the roll paper holder 3 on the printer body 2. As described above, the engaging portion 37f is projected downward from the rear portion of the bottom of the holder body 37, and the claw 37g is projected forward from the engaging portion 37f. Further, the fixing portions 42 are projected downward from the fore portion of the bottom of the holder body 37, and are respectively provided with the fixing recess portions 42a. On the surface of the printer body 2, fixing pins 47 are provided in two pieces of fixing grooves 7 respectively corresponding to the fixing recess portions 42a. Further, the engaging groove 2a is provided at the upper end of the rear surface correspondingly to the claw 37g.

To install the roll paper holder 3 on the printer body 2, as shown in FIGS. 11 and 12, the claw 37g is first made to engage with the engaging groove 2a, and the roll paper holder 3 is rotated counterclockwise around this engaged portion. By doing so, the recess portion 42a is fitted to the fixing pin 47 as shown in FIG. 13, since one end of the roll paper holder 3 is fixed by the engaging portion 37f. In this arrangement, the fixing pin 47 and the engaging groove 2a are securely placed in position by the engaging portion 37f and the fixing portion 42, whereby the roll paper holder 3 is securely mounted on the printer body 2 by the affect of elastic force of the roll paper holder 3. To remove the roll paper holder from the printer body 2, the roll paper holder 3 is tilted rearward so as to pivot the roll paper holder about the engaging portion 37f.

Figure 14:
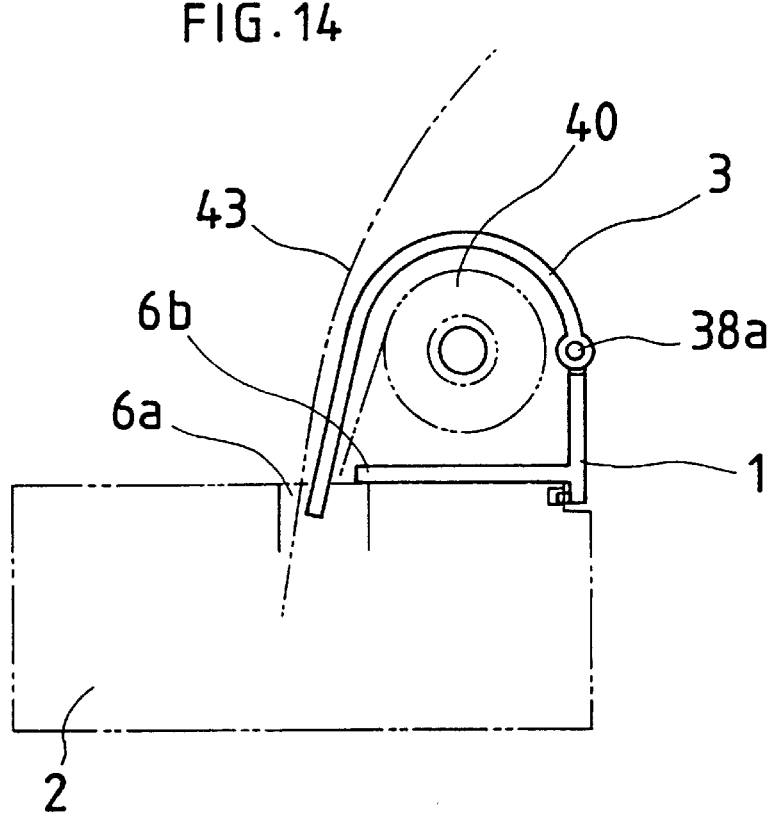
FIG. 14 is a sectional view showing the roll paper holder mounted on the printer body.

Referring to FIG. 14, the roll paper holder is mounted on the printer body 2 so that the front surface of the roll paper cover 38 makes a small an angle of elevation with respect to the printer body, and the lower end of the roll paper cover is inserted to a small extend into the approximate center of the opening 6 provided in the printer body 2, forming between itself and the holder body 37 the roll paper inlet 6b, which allows the free end of the roll paper 40 to be introduced into the printer body 2, as well as the cut paper inlet 6a which allows the cut paper 43 inserted along the front surface of the roll paper cover 38 to be introduced into the printer body 2. FIG. 14 further shows the state in which the cut paper 43 is loaded after the roll paper 40 has been retreated from the printer body 2 by rewinding the roll paper 40 round the core by using the knob 41e.

Figure 15:
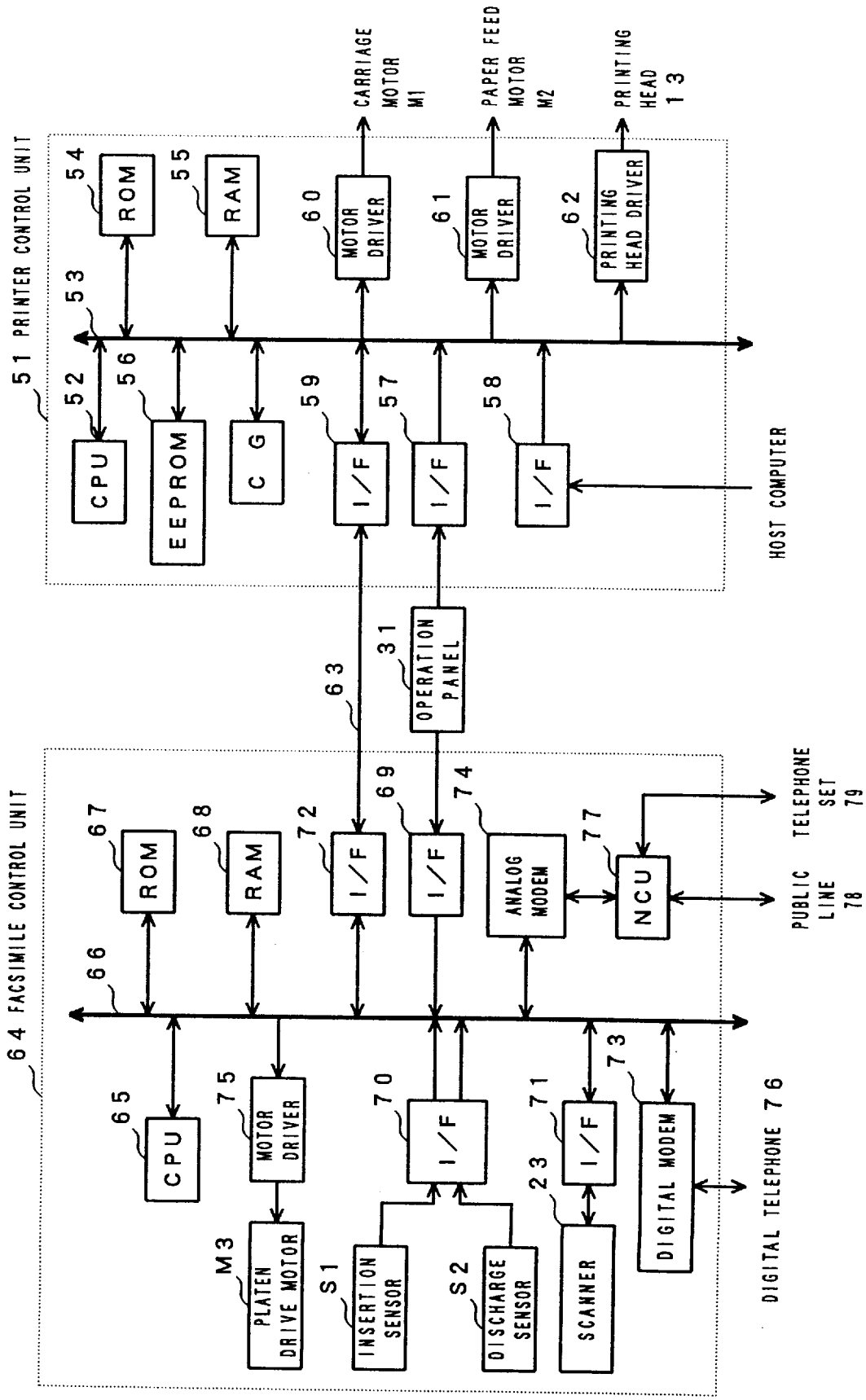
FIG. 15 is a block diagram showing essential parts of a control system in the printer/facsimile device.

Next, referring to FIGS. 3 and 15, a description will now be given of a control system of a printer/facsimile device 1. As shown in FIG. 3, an operation panel control substrate 48, a printer control substrate 49 and a facsimile control substrate 50 are installed in the body 2. FIG. 15 shows a control system of the printer/facsimile device 1. The printer control substrate 49 shown in FIG. 3 is provided with a printer control unit 51 shown in FIG. 15, and the facsimile control substrate 50 shown in FIG. 3 is provided with a facsimile control unit 64 shown in FIG. 15.

Connected through an internal bus 53 to a CPU 52 of the printer control unit 51 are a ROM 54 containing control programs used to perform various controls concerning printing operation such as movement of the carriage 15 mounted with the printing head 13, printing operation by the printing head 13 and feed of printing paper, a RAM 55 available for arithmetic operation and temporary storage of data, an EEPROM 56 as a rewritable non-volatile memory to store data, a character generator CG storing image data such as characters, and interfaces 57 to 59. A carriage motor M1 for driving the carriage 15 is connected to a motor driver 60, a feed motor M2 for driving the feed roller 12 to feed printing paper is connected to a motor driver 61, and the printing head 13 is connected to a printing head driver 62.

The CPU 52 of the printer control unit 51 detects an operation input signal sent from the operation panel 31 through the interface 57, and establishes communication with a host computer through the interface 58. Further, the interface 59 is connected to the facsimile control unit 64 through an external bus 63, and establishes communication between the printer control unit 51 and the facsimile control unit 64.

Connect through an internal bus 66 to a CPU 65 of the facsimile control unit 64 are a ROM 67 storing control programs used to perform various controls concerning transmission and reception of data by the facsimile such as reading of originals by the scanner 23 and transmission and reception of data, a RAM 68 available for arithmetic operation and temporary storage of data, interfaces 69 to 72, a digital modem 73 and an analog modem 74. A motor driver 75 is connected to a drive motor M3 for driving the scanner platen roller 21 for feeding the original to the scanner 23.

The CPU 65 of the facsimile control unit 64 detects an operation input signal sent from the operation panel 31 through the interface 69, detects each of detection signals sent, through the interface 70, from an insertion sensor S1 for detecting whether or not the original is inserted, and a discharge sensor S2 for detecting whether or not the original is discharged, and then writes image data scanned by the scanner 23 in a predetermined area of the RAM 68 through the interface 71. The interface 72 is connected to the external bus 63 and establishes communication between the printer control unit 51 and the facsimile control unit 64.

In addition, the CPU 65 transmits and receives facsimile data by a digital telephone 76 through the digital modem 73, and also transmits and receives facsimile data by a general public line 78 through the analog modem 74, a NCU (Network Control Unit) 77 connected to the analog modem 74 and a telephone set 79.

The RAM 68 has a received facsimile data storage area, in which facsimile data received through the digital modem 73 and the analog modem is temporarily stored, an outgoing facsimile data storage area, in which facsimile data to be sent is stored, a scanner data storage area, in which image data scanned by the scanner 23 is temporarily stored, and a printing data edit area, in which printing data is created and edited on the basis of image facsimile data stored in the received facsimile data storage area and the scanner data storage area, and so on.

The printer/facsimile device 1 is used as described in the following.

When using the cut paper, the release lever 32 shown in FIG. 1 is pushed up to release the feed roller 12 from the contact under pressure, then the cut paper is inserted into the cut paper inlet 6a in the rear surface of the body 1 toward the printing head 13 as shown in FIG. 3, and the release lever 32 is pressed down to make the cut paper held between the upper and lower rollers 12a and 12b of the feed roller 12, providing a paper feed enable condition.

On the other hand, when using the roll paper the release lever 32 is pushed up to release the feed roller 12 from the contact under pressure, then the roll paper holder 3 is installed on the rear surface of the body 2 as described above after removing the cut paper, then the front of the roll paper is inserted into the roll paper inlet 6b toward the printing head 13 by operating the knob 41e, and the release lever 32 is pressed down to make the roll paper held between the lower and upper rollers 12a, 12b of the feed roller 12, providing a paper feed enable condition.

When using the printer/facsimile device 1 as an ordinary printer, a printer mode is specified by depressing corresponding one of operation input keys 29 shown in FIG. 1. As shown in FIG. 15, the input signal for operation from the operation panel 31 is received by both the printer control unit 51 and the facsimile control unit 64. In the printer mode, the printer control unit 51 is operated, whereas the facsimile control unit 64 is not substantially operated.

Print data, when sent from the host computer through the interface 58, is temporarily stored in a predetermined storage area of the RAM 55. In printing, the CPU 52 drives the feed motor M2 through a motor driver 61 to feed the printing paper toward the printing head 13 while driving the feed roller 12 in the direction shown by an arrow in FIG. 3, drives the carriage motor M1 through a motor driver 60 to read out one line of the data to be printed while reciprocating the carriage 15 mounted with the printing head 13 in the lateral direction of the body, and drives the printing head 13 through a printing head driver 62 to perform thermal printing in sequence. The printed paper is fed toward the printed paper outlet 10 in sequence by the paper feed roller 12.

When using the printer/facsimile device 1 as a facsimile device, a facsimile mode is specified by corresponding one of input keys 29 shown in FIG. 1. In the facsimile mode, the facsimile control unit 64 enters the operating state, and the printer control unit 51 accepts only a print command and print data from the facsimile control unit 64 but will not accept any print data and print command from the host computer.

When sending facsimile data, as shown in FIG. 3, an original is inserted into the original inlet 19 in the lower portion of the front surface of the body 2 toward the scanner platen roller 21. In this case, the original insertion sensor lever 24 is made to pivot on, its axis, causing the insertion sensor S1 to be turned on. When the insertion sensor S1 is turned on, the CPU 65 shown in FIG. 15 makes the motor driver 75 drive the platen drive motor M3 to rotate the scanner platen roller 21 clockwise in FIG. 3, and stop the platen drive motor M3 after the front of the original has been fed up to the reading position of the scanner device 23.

A command for start is input through corresponding one of operation input keys 29. Responding to this, the CPU 65 drives the platen drive motor M3 again, causing the scanner platen roller 21 to rotate clockwise in FIG. 3 to feed the original, and the scanner 23 to read the original line by line in sequence. The read image data is stored in the scanner data storage area of the RAM 68.

Further, the end of the original is detected by counting the number of read lines from the point when the insertion sensor S1 is turned off after the end of the original has passed the original insertion sensor lever 24, and reading of the original is completed when the count of lines reaches a predetermined value.

The original, after having been read, is fed toward the original outlet 20 and then discharged. When the front of the original reaches the original discharge sensor lever 25, the discharge sensor S2 is turned on. When the end of the original has passed the original discharge sensor lever 25, the discharge sensor S2 is turned off, and the CPU 65 stops the platen drive motor M3.

When the original is completely read by the scanner 23, the CPU 65 sends the facsimile data stored in the scanner data storage area of the RAM 68. When sending the facsimile data by a digital telephone 7b, the digital modem 73 is used, while the analog modem 74 and the NCU 77 are used when sending by a general public line 78.

When facsimile data by the digital telephone 76, the digital modem 73 is used, while the NCU 77 and the analog modem 74 are used when receiving through the general public line 78. The received facsimile data is stored in the facsimile data storage area. Further, when data is received through either one of the digital modem 73 or the analog modem 74, the other will not accepted the same data.

To print and output the received facsimile data, printing data is created and edited on the basis of the image facsimile data stored in the received facsimile data storage area and the scanner data storage area in the RAM 68, and is then stored in a printing data edit area. This printing data is sent to the RAM 55 in the printer control unit 51 through the internal bus 66, the interface 72, the external bus 63, the interface 59 and the internal bus 53, and is temporarily stored therein. Further, the CPU 52 in the printer control unit 51 prints the data on the printing paper as described above.

According to the present invention, it is possible to provide the composite portable printer/facsimile device having both the facsimile function and the ordinary printer function.

Further, the printer unit being disposed above the scanner unit, the printing paper insertion position and the printed paper discharge position may be set at a higher level, thereby making easier loading and unloading of printing paper.

Since the serial thermal head is employed for the printing head of the printer unit, the circuit configuration is not complicated, and the printer/facsimile device of the present invention can be used as an ordinary printer capable of printing out print data inputted through the external device.

Further, the roll paper holder can removably be mounted on the outside surface of the body, so that the roll paper can be used when a large volume of received facsimile data has to be printed out, and the roll paper holder can be removed from the body when not needed, thereby contributing to the improvement in the portability of the printer/facsimile device.

The roll paper holder can be easily be mounted on or removed from the printer body by single operation.

Since the roll paper cover serves as the cut paper insertion guide in a condition that it is mounted on the printer body, the cut paper can stably be guided without providing any dedicated guide for the cut paper.

Since the engaging portion and the fixing portion needed to mount the roll paper holder on the printer body are projected from the holder body, any projection need not be provided on the printer body, thereby making it easier for the printer/facsimile device to be carried as a unit.

With the roll paper in a roll paper holder mounted on the printer body, the roll paper can be inserted into the printer body by letting out the roll paper. On the other hand, when using the cut paper, the roll paper can be withdrawn from the printer body by taking up the roll paper. Since the operating portion of the roll paper support member is easily operated with the fingers, it is easy to let out and take up the roll paper.

Since the roll paper passage opening is defined by one end surface of the holder body and the front end of the roll paper cover, the holder body can easily be loaded with the open end of the roll paper put out, thereby making easier loading of the roll paper. The transparent window provided in the holder body makes it easier to check the remaining quantity of the roll paper.

The roll paper support member has the projecting stoppers, so that the roll paper operating member can easily be mounted on the holder body. The roll paper support portion of the holder body is supported by the roll paper support arm which forces the loaded roll paper toward its axial direction, so that the roll paper is prevented from being moved in the axial direction, thereby preventing the resultant prints from being irregular and making easier loading and unloading of the roll paper. The roll paper support member is supported slidably in the axial direction, so that loading and unloading of the roll paper can be made easily by forcing the roll paper towards its axial direction.

What is claimed is:

1. A portable printer/facsimile device, comprising:
   a scanner unit having a platen roller for feeding originals, arranged in the middle of an original carrying passage between an inlet and an outlet for the original, and a scanner disposed in confronting relation to said platen roller, for reading the information to be sent on the original;
   a printer unit having a printing platen arranged in the middle of a printing paper carrying passage between a printing paper inlet and a printed paper outlet, and a printing head disposed in confronting relation to said printing platen;
   a telephone connection terminal;
   a printer cable connection terminal;
   a battery housing for accommodating a battery as a drive power source;
   a facsimile control unit for sending facsimile data read by said scanner unit through said telephone connection terminal and for holding received facsimile data inputted through said telephone connection terminal;
   a printer control unit for controlling said printer unit to print out the printing data inputted through said printer cable connection terminal and the received facsimile data held by said facsimile control unit; and
   a casing for accommodating said scanner unit, said printer unit, said telephone connection terminal, said printer cable connection terminal, said battery housing, said facsimile control unit and said printer control unit, said casing having a roll paper holder mounting portion for mounting a roll paper holder at an outer surface thereof;
   wherein said printer unit, said printer control unit and said facsimile control unit are arranged at an upper portion of said casing, and said scanner unit and said roll paper holder mounting portion are arranged at a lower portion of said casing, and operational keys are arranged at the uppermost portion of said casing.

2. A portable printer/facsimile device according to claim 1, wherein said printing paper carrying passage of said printer unit is arranged substantially horizontally between said printer unit and said scanner unit.

3. A portable printer/facsimile device according to claim 1, further comprising a roll paper holder detachably mounted on said casing at said roll paper holder mounting portion.

4. A portable printer/facsimile device according to claim 3, wherein said roll paper holder comprises:
   a holder body having a roll paper chamber for accommodating roll paper therein;
   a roll paper cover pivotally supported on said holder body so as to open and close said roll paper chamber;
   a roll paper supporting member rotatably supported on said holder body so as to support one end of a core of said roll paper;
   a roll paper supporting portion provided on said holder body, for rotatably supporting the other end of the core of said roll paper; and
   an engaging portion and a fixing portion for engaging with said printer body.

5. A portable printer/facsimile device according to claim 4, wherein said holder body is fixed to said printer body by means of an elastic force of said holder body.

6. A portable printer/facsimile device according to claim 4, wherein a roll paper passage opening is formed by an end surface of said holder body and a distal end of said roll sheet cover.

7. A portable printer/facsimile device according to claim 4, wherein said roll paper cover forms a guide for cut paper to insert into said printer body when said holder body is attached to said printer body.

8. A portable printer/facsimile device according to claim 4, wherein said engaging portion comprises a projection having a claw at its distal end and projecting from a mounting surface of said holder body.

9. A portable printer/facsimile device according to claim 4, wherein said fixing portion comprises a projection having a recess and projecting from a mounting surface of said holder body.

10. A portable printer/facsimile device according to claim 4, wherein said roll paper supporting member has a biting portion formed at an end thereof so as to bite the core of said roll paper, and an operating portion for winding up and letting out said roll sheet from outside.

11. A portable printer/facsimile device according to claim 10, wherein said operating portion is formed into a shape of a disk and has a projecting knob to transverse the disk through a center thereof.

12. A portable printer/facsimile device according to claim 4, wherein said roll paper supporting portion is supported on a roll paper supporting arm for giving an urging force so as to prevent said roll paper from being moved in the axial direction thereof.

13. A portable printer/facsimile device according to claim 4, wherein said roll paper supporting member is slidably supported in an axial direction thereof on said holder body so as to permit said roll paper to be held removably, and has an urging member for urging said roll paper supporting member in the axial direction when loading and unloading said roll paper.

14. A portable printer/facsimile device according to claim 1, wherein a printing head of said printer unit comprises a serial thermal head.

15. A portable printer/facsimile device, comprising:

a scanner unit having a platen roller for feeding originals, arranged in the middle of an original carrying passage between an inlet and an outlet for the original, and a scanner disposed in confronting relation to said platen roller, for reading the information to be sent on the original;

a printer unit having a printing platen arranged in the middle of a printing paper carrying passage between a printing paper inlet and a printed paper outlet, and a printing head disposed in confronting relation to said printing platen;

a telephone connection terminal;

a printer cable connection terminal;

a battery housing for accommodating a battery as a drive power source;

a facsimile control unit for sending facsimile data read by said scanner unit through said telephone connection terminal and for holding received facsimile data inputted through said telephone connection terminal;

a printer control unit for controlling said printer unit to print out the printing data inputted through said printer cable connection terminal and the received facsimile data held by said facsimile control unit;

a roll paper holder detachably mounted on an outer surface of a printer body for housing said scanner unit, said printer unit, and said facsimile control unit;

a holder body having a roll paper chamber for accommodating roll paper therein; and a roll paper supporting member rotatably supported on said holder body so as to support one end of a core of said roll paper;

wherein said roll paper supporting member has a stopper projection having an inclined surface inclined with respect to a direction of inserting said roll paper supporting member into the holder body and a perpendicular surface perpendicular to a direction of pulling out said roll paper supporting member from the holder body, said stopper projection being elastically sinkable into said roll paper supporting member.

16. A portable printer/facsimile device, comprising:

a scanner unit having a platen roller for feeding originals, arranged in the middle of an original carrying passage between an inlet and an outlet for the original, and a scanner disposed in confronting relation to said platen roller, for reading the information to be sent on the original;

a printer unit having a printing platen arranged in the middle of a printing paper carrying passage between a printing paper inlet and a printed paper outlet, and a printing head disposed in confronting relation to said printing platen;

a telephone connection terminal;

a printer cable connection terminal;

a battery housing for accommodating a battery as a drive power source;

a facsimile control unit for sending facsimile data read by said scanner unit through said telephone connection terminal and for holding received facsimile data inputted through said telephone connection terminal;

a printer control unit for controlling said printer unit to print out the printing data inputted through said printer cable connection terminal and the received facsimile data held by said facsimile control unit;

a roll paper holder detachably mounted on an outer surface of a printer body for housing said scanner unit, said printer unit, said telephone connection terminal, said printer cable connection terminal, said battery housing, said printer control unit, and said facsimile control unit;

a holder body having a roll paper chamber for accommodating roll paper therein;

a roll paper supporting member for supporting one end of a core of said roll paper; and a roll paper supporting portion provided on said holder body, for rotatably supporting the other end of the core of said roll paper;

wherein said printer unit, said printer control unit, and said facsimile control unit are arranged at an upper portion of said printer body, said scanner unit is arranged at a lower portion of said printer body, and operational keys are arranged at the uppermost portion of said printer body.

* * * * *